United States Patent [19]

Daley

[11] 4,140,295
[45] Feb. 20, 1979

[54] OBJECT SUPPORT MEMBER

[76] Inventor: Thomas G. Daley, 9716 Lanesboro Way, Louisville, Ky. 40222

[21] Appl. No.: 774,612

[22] Filed: Mar. 4, 1977

Related U.S. Application Data

[62] Division of Ser. No. 690,437, May 27, 1976, Pat. No. 4,030,187.

[51] Int. Cl.² .............................................. B65D 19/00
[52] U.S. Cl. .................... 248/346; 108/901; 206/320
[58] Field of Search .................. 248/346, 119 R; 108/51.1, 51.3, 53.1, 53.3, 55.1, 55.3, 55.5, 56.1, 56.3, 57.1, 901; 206/386, 320, 599, 600

[56] References Cited

U.S. PATENT DOCUMENTS

| 2,447,285 | 8/1948 | Simonton et al. | 108/57.1 |
| 2,559,930 | 7/1951 | Bolton et al. | 206/386 X |
| 2,969,170 | 1/1961 | Waldorf | 206/320 X |
| 3,436,045 | 4/1969 | Anspaugh | 248/119 R |
| 3,626,860 | 12/1971 | Blatt | 108/51.3 |
| 3,759,471 | 9/1973 | Sholtes | 248/119 R |
| 3,881,429 | 5/1975 | Seymore | 108/51.3 |
| 3,921,279 | 11/1975 | Daley | 248/346 X |

FOREIGN PATENT DOCUMENTS

| 838909 | 6/1960 | United Kingdom | 108/51.1 |
| 1144715 | 3/1969 | United Kingdom | 108/51.1 |

Primary Examiner—Roy D. Frazier
Assistant Examiner—William E. Lyddane
Attorney, Agent, or Firm—Charles G. Lamb

[57] ABSTRACT

A method for preparing and an apparatus for supporting appliances thereon, the support being a base member with means on the top side thereof for mounting an object thereto. The base member is comprised of a conduit member having disposed at preselected portions therein hollow inserts arranged with axes at right angles to the axis of the conduit member and surrounded by resilient foam materials which maintains the base member in a preselected configuration to support the object mounted thereto.

13 Claims, 5 Drawing Figures

OBJECT SUPPORT MEMBER

CROSS REFERENCE TO RELATED APPLICATIONS

This application is a divisional of application Ser. No. 690,437 filed May 27, 1976, now U.S. Pat. No. 4,030,187, for an application entitled "OBJECT SUPPORT MEMBER."

BACKGROUND OF THE INVENTION

This invention relates to a method of preparing support runners for an object, and more particularly relates to an apparatus for supporting an object for shipment.

In the preparation of hard goods for shipment, such as major appliances, it is an accepted practice to mount these goods onto runners or skids, the runners or skids absorbing shock and preventing damage to the goods during shipment. After the goods have reached their destination the support runners are usually removed from the major appliances and discarded. Presently, the most common support runners utilized in the shipment of major appliances are runners comprised of a pair of strips of wood with shock absorbing material, such as a resilient foam material, sandwiched therebetween, the runners being attached in parallel along opposing edges of the appliance. However, with the increasing cost of wood in the manufacture of these runners, it has been necessary to find a more economical means of support for these goods, as well as one that will withstand shock and prevent damage in shipment from the manufacturing plant to the ultimate point of use. Other suggested supports have included fiberboard supports with polyurethane foam therein such as those described in British Pat. No. 1,144,715. However, upon stacking the supported objects one on top of the other, for several layers, the fiberboard supports as noted in British Pat. No. 1,144,715 containing diagonally disposed supports therein with polyurethane in between tend to collapse.

SUMMARY OF THE INVENTION

In the present invention, it is recognized that it is desirable to provide an appartus for supporting an object for shipment which is economical to manufacture. It is further recognized that it is desirable to provide an apparatus for supporting an object for shipment which is equal or superior to the supports presently available commercially.

The present invention advantageously provides a straightforward arrangement for a shipping support for an object. The present invention further provides a method for manufacturing shipping supports for objects. The present invention even further provides for a support for an object for shipping which is economical to manufacture in comparison with presently available shipping supports for hard goods and yet has improved support characteristics.

Various other features of the present invention will become obvious to those skilled in the art upon reading the disclosure set forth hereinafter.

More particularly, the present invention provides a method for making a support for objects comprising the steps of: inserting into a conduit member at selected positions therein an insert with an opening therethrough, the axes of the opening and the conduit member being at right angles to one another; feeding a resilient foam mix into preselected portions of said conduit member substantially enclosing the inserts; curing the resilient foam mix to form a resilient foam support within the selected portions of the conduit member; and, securing object mounting means at selected points along the top outer surface of the conduit member for mounting an object thereto.

Even more particularly, the present invention provides a support for an object comprising: at least one conduit base member with means on the top side thereof for mounting an object thereon; the conduit member having disposed at preselected positions therein inserts with an opening therethrough, the axes of the opening and the conduit member being at right angles to one another; a resilient foam material substantially enclosing the inserts, the resilient foam material being affixed to the inner surface of the conduit member and serving to maintain the conduit member in a preselected configuration and prevent movement of the insert when an object is mounted onto the conduit member.

It is to be understood that the description of the examples of the present invention given hereinafter are not by way of limitation. Various modifications within the scope of the present invention will occur to those skilled in the art upon reading the disclosure set forth hereinafter.

Referring to the drawings.

Figure 1:
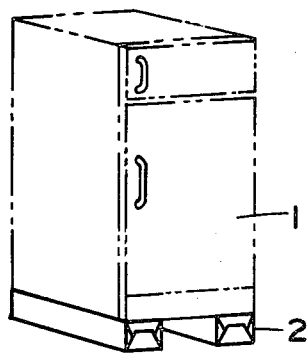
FIG. 1 is a perspective view illustrating a preferred object support of the present invention with an object mounted thereto.

In FIG. 1 of the drawing, an object, such as a refrigerator 1, is shown mounted onto a pair of supports 2 of the present invention.

Figure 2:
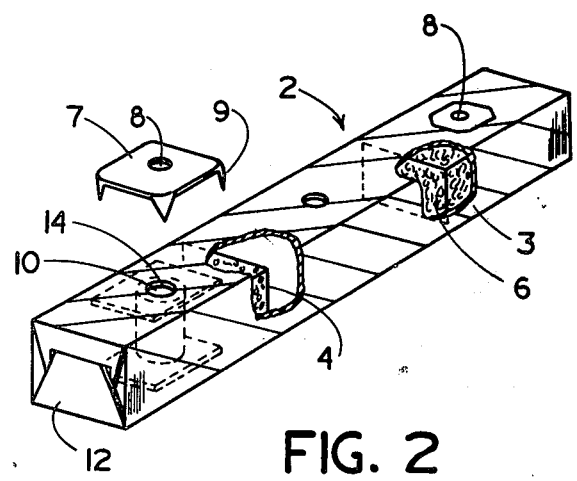
FIG. 2 is a perspective view, partially cut-away, of an object support member of the present invention.
Figure 3:
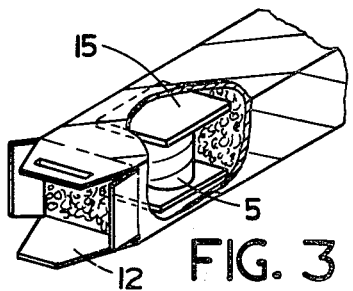
FIG. 3 is a perspective view, partially cut-away, of one end of the object support member of FIG. 2.

In FIGS. 2 and 3, one support 2 shown in FIG. 1 is illustrated with selected portions cut-away. The support 2 of the present invention includes a hollow conduit member 3 which is exemplified by a 50 pound semi-chemical recycled container board of rectangular configuration. The rectangular shaped conduit member 3 is generally convolute wound. At substantially each end of the tube 3 is a preselected resilient foam portion identifiable by numerals 4 and 6 with a cylindrical tube 5 having an axis at right angles to the axis of the tube 3 surrounded and held in place by the foam. One preferred resilient foam is a polyurethane and the tube 5 is generally a heavy gauge fiberboard formed in layers bonded together or heavy caliper cylinderboard. The resilient foam portions in combination with the vertically extending tube 5 are provided to maintain the spiral member 3 in a preselected geometric configuration with an object, such as the refrigerator 1, mounted thereto. It has been found that by using a tube 5 which is a heavy gauge fiberboard, the support can hold up to seven refrigerators mounted vertically thereon. Also, it has been found that inserting the tube 5 within the member 3 prior to adding a foam mix thereto, tube 5 prevents the reacting foam from encroaching into the area disposed in alignment with an opening 14 in the member 3 thereby providing a mounting bolt cavity.

Provided along the top side of the member 3 is a pair of mounting plates 7, mounting plates 7 being included for receiving bottom mounting surfaces of the hardware which is to be supported. The mounting plates 7 are shown as being 0.025 inch steel with corners 9 bent at approximately 90° to the mounting surface and embedded into the member 3. Generally, the mounting plate 7 including opening 8 therethrough is in alignment with the opening 10 in the vertically extending cylindrical tube 5. The opening 10 is disposed therein for receiving the leveling or mounting bolt (not shown) therethrough. The bolts are generally mounted through selected apertures in the bottom mounting surface of the object which is to be mounted onto the support. As exemplified, the mounting plates 7 are rectangular in shape, but it is realized that other configurations may also be utilized. Furthermore, it is even realized that for some applications mounting plates may not be necessary and the object to be supported may be mounted directly to the partially foam filled conduit member with the vertically extending cylindrical tubes 5 therein.

Generally, resilient foam portions 4 and 6 are disposed only at each end of the support member 2. However, in certain instances where the object to be mounted thereto is long, heavy, or protection against a relatively large degree of shock is necessary, additional preselected portions of the member 3 may include the resilient foam therein.

Also, embedding the mounting plates 7 into the top surface of the member 3 with the bent corners 9 is usually sufficient to maintain the mounting plates 7 in place. However, in certain instances it may be necessary to adhesively secure the plates 7 to the member 3 by means of, for example, a "hot melt" glue. Such glues or adhesives are well known in the art and it is only necessary that they form a strong bond between the underside of the plates 7 and the outer surface of the member 3 to hold the plates 7 in place.

Resilient foam portions 4 and 6 may be formed of any suitable resilient foamed material. A polyurethane foam is a preferred material since it has been found that it has the most desirable characteristics of foam material presently available on the market. It is to be understood, of course, that other resilient foamed materials may be entirely suitable for use in the support depending upon the sensitivity of the object to be carried. Thus, for instance, foamed polyethylene, expanded polystyrene, foam rubber and the like may also be used.

It is realized that the tube 5 may be of unitary construction and fitted tightly into the end of the member 3 with the opening 10 in alignment with opening 14 in the member 3 or the tube 5 may include a flat solid plate member 15 sandwiched between the tube 5 and the inner surface of member 3. The flat solid plate member 15 is utilized to keep a leveling or mounting bolt (not shown) from pulling out of the member 3 during impact. Plate member 15 may be metallic, plastic, wood or the like, but one preferred member 15 is a heavy resin-impregnated fiberboard pad adhesively secured on one face to the tube 5 and adhesively secured on the opposed face to the inner surface of member 3.

The member 3 may also be provided with integral interlocking end flaps as designated by the numeral 12 which prevents the reacting foam from leaking out the end of the member 3 during the foaming reaction.

Figure 4:
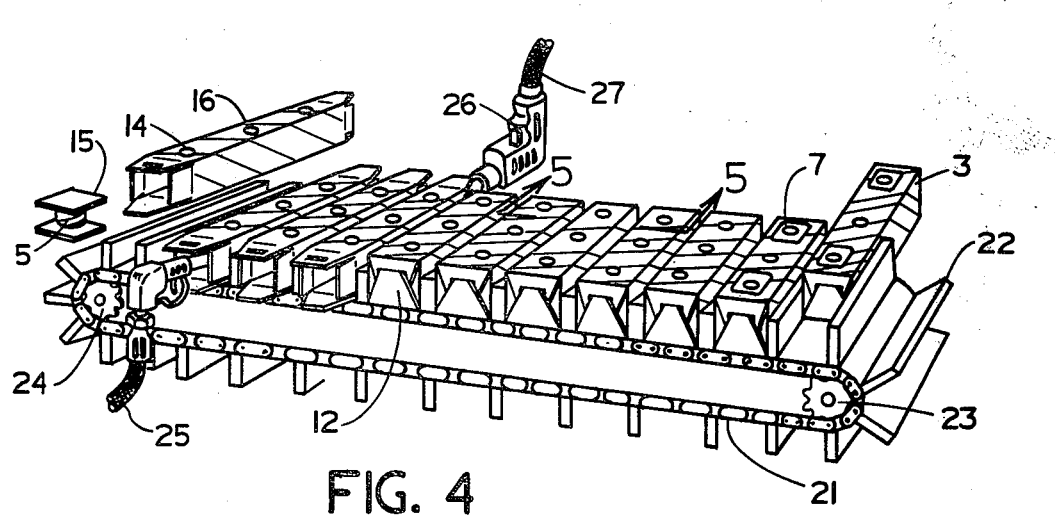
FIG. 4 is a diagramatic representation of one preferred apparatus for manufacturing an object support of the present invention; and, FIG. 5 is a sectional view taken along line 5—5 of FIG. 4.

FIG. 4 illustrates one preferred method for making an object support member of the present invention. In a preferred embodiment a conveyor 21 with a plurality of flights 22 thereon are provided for movement about a pair of rolls 23 and 24, one of said rolls, exemplified as roll 24, being driven by a suitable motor driving means (not shown). The cross-sectional area between the flights 22 corresponds substantially to the cross-sectional area of the spirally wound hollow member 3 which is inserted therebetween. Furthermore, the length of the flights 22 are generally the same length as the spirally wound members 3.

Figure 5:
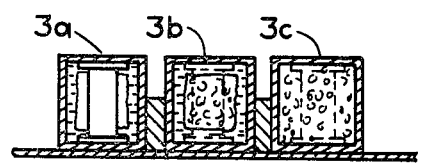

In FIG. 5, a sectional view of members 3 after addition of the resilient foam mix, illustrates the foaming reacting as the members 3 move toward the discharge end of conveyor 21. Member 3a shows the member immediately after the addition of the spray mix 31 to the hollow member. Member 3b shows the member during the foaming reaction and member 3c shows the member after the foaming reaction is complete.

In the processing of a hollow member 3, a pair of flat skid plate members 15 are attached to each end of a tube 5 with a "hot melt" adhesive, generally selected from the group consisting of hide glues, bone glues, polyethylene base binders, polypropylene base binders, ethylene vinyl acetate binders, and the like, as well as other thermosplastic adhesive that flow at elevated temperatures, such as 350° F, but upon chilling harden and become tacky. The tube 5 with the plate member 15 attached thereto is then placed within the member 3, each tube 5 having its axis disposed vertically in alignment with an opening 14 in member 3. A hot melt adhesive is then added to the outer surface of the member 15 which is in contacting relationship with the inner surface of member 3, but this is usually not necessary of the tube 5 and plate member 15 are constructed for a tight fit into member 3. The hollow member 3 is then mounted between two flights 22 at the feed end of the conveyor. The hollow member 3 on the conveypr 21 moves to a position adjacent to pre-heat air gun 25 wherein gun 25 is inserted into the hollow member 3. Pre-heated compressed or blown air is then forced into the member 3 whereby the temperature of the inner surface of member 3 is brought to a temperature sufficient to start the reaction of the foaming mix which is to be added later in the process. It is noted that when utilizing a polyurethane foam mix, the pre-heated air is utilized to bring the temperature of the inner surface of member 3 to a temperature of at least 110° F. When the inner surface of the hollow member 3 has been brought to the reacting temperature, a foam filling probe 26 attached to a conduit 27 which is in fluid communication with the reactant mix (not shown) is inserted into the hollow member 3, probe 26 being activated at the preselected positions to completely surround and enclose the tube 5, the foam mix being sprayed around the inner surface of the hollow member 3 at said location for a preselected period of time thereby covering a preselected portion of the member 3. As shown in FIG. 4 probe 26 is inserted into only one end of the member 3. However, it is realized that in most instances the probe 26 is inserted first in one end around tube 5 then the other. Once the probe 26 is removed, end flaps 12 of the hollow support member 3 are interlocked to prevent the foam from leaking out during the foaming reaction. Support member 3 then continues along the conveyor 21 wherein the reaction mix cures.

It is noted that the member 3 includes an aperture 16 disposed substantially in the middle of the top of the member 3. The aperture 16 is necessary to allow for the evacuation of carbon dioxide or other by-product gases which evolve during and after the injection of the reaction mix.

As the supports 3 near the discharge end of the conveyor 21, mounting plates 7 are added to the support members 3.

It will be realized that various changes may be made to the specific embodiment shown and described without departing from the principles of the present invention.

What is claimed is:

1. A support for an object comprising: at least one conduit base member with means on the top side thereof for mounting an object thereon; said conduit member having disposed at preselected positions therein inserts with an opening therethrough, the axes of the opening and the conduit member being at right angles to one another; a resilient foam material substantially enclosing the inserts, said resilient foam material being affixed to the inner surface of said conduit member and serving to maintain said conduit member in a preselected configuration and prevent movement of the insert when an object is mounted onto said conduit member; and, flat solid plate members disposed between said inserts and an inner surface of said conduit member and adhesively secured thereto.

2. The support of claim 1 wherein the cross-sectional configuration of said resilient foam material is substantially the same as the cross-sectional configuration of the inner surface of said conduit member.

3. The support of claim 1 wherein said resilient foam material is a polyurethane foam.

4. The support of claim 1 wherein the conduit member includes mounting means at each end thereof.

5. The support of claim 4 wherein the mounting means includes two mounting plates, one at each end of said conduit member, each of said mounting plates being in alignment with said resilient foam material.

6. The support of claim 1 wherein the mounting means is a flat piece with corners bent at approximately right angles to said plate, said corners being embedded into said hollow member.

7. The support of claim 6 wherein said mounting means is adhesively attached to said hollow member.

8. The support of claim 1 wherein said resilient foam material is disposed at each end of each conduit member.

9. The support of claim 1 wherein said conduit member is paperboard.

10. The support of claim 1 wherein said object is an appliance.

11. The support of claim 1, said inserts being vertically extending cylindrical tubes.

12. The support of claim 1 wherein said flat solid plate members are heavy resinimpregnated fiberboard pads adhesively secured on one face to said inserts and adhesively secured on the opposed face to said inner surface of said conduit member.

13. The support of claim 1 including two conduit base members in parallel, each of said members being positioned along the outer edge of said object to be supported, said conduit base members being of substantially the same length as the edge of said object to which they are attached.

* * * * *